United States Patent [19]

Inaba

[11] Patent Number: 4,601,653
[45] Date of Patent: Jul. 22, 1986

[54] INJECTION MECHANISM IN INJECTION MOLDING APPARATUS

[75] Inventor: Yoshiharu Inaba, Kawasaki, Japan
[73] Assignee: Fanuc Ltd., Minamitsuru, Japan
[21] Appl. No.: 772,337
[22] PCT Filed: Dec. 21, 1984
[86] PCT No.: PCT/JP84/00609
    § 371 Date: Aug. 22, 1985
    § 102(e) Date: Aug. 22, 1985
[87] PCT Pub. No.: WO85/02811
    PCT Pub. Date: Jul. 4, 1985
[30] Foreign Application Priority Data Dec. 22, 1983 [JP] Japan .............................. 58-241057

[51] Int. Cl.⁴ .............................................. B29F 1/04
[52] U.S. Cl. ...................................... 425/587; 366/79
[58] Field of Search ...................... 264/40.7; 425/587; 366/79

[56] References Cited

U.S. PATENT DOCUMENTS

| | | | |
|---|---|---|---|
| 3,359,601 | 12/1967 | Evans | 425/587 X |
| 3,375,553 | 4/1968 | Criss | 425/587 |
| 3,544,665 | 12/1970 | Bowers | 264/40.7 |
| 3,888,393 | 6/1975 | Drori | 425/587 X |

Primary Examiner—J. Howard Flint, Jr.
Attorney, Agent, or Firm—Staas & Halsey

[57] ABSTRACT

An injection molding apparatus including a power transmission device is provided for axially moving a screw by a rotational force of a motor received through a first clutch. During non-injection/non-metering, the motor is driven to cause an energy accumulation device to accumulate energy through a second clutch. During injection, a driving force of the motor and the energy accumulated in the energy accumulation device achieve high-pressure, high-speed injection with good response characteristics.

5 Claims, 2 Drawing Figures

INJECTION MECHANISM IN INJECTION MOLDING APPARATUS

FIELD OF THE INVENTION

The present invention relates to an injection mechanism and to moving a screw in an axial direction to inject a molding material in an injection molding apparatus.

BACKGROUND OF THE INVENTION

A hydraulic or electric motor is used in a conventional injection mechanism for moving a screw in an axial direction to inject a molten molding material. For this reason, the horsepower and size of a motor must be increased in order to perform high-pressure, high-speed injection. However, when the motor size is increased, the injection molding apparatus becomes expensive as a whole. Furthermore, the rotor size of the motor must be increased to prolong the response time due to inertia influence, resulting in inconvenience.

SUMMARY OF THE INVENTION

It is an object of the present invention to provide an injection mechanism in an injection molding apparatus, which solves the conventional drawbacks, is low cost, has good response characteristics and provides high-pressure, high-speed injection without using a large motor.

It is another object of the present invention to provide an injection mechanism for performing high-pressure, high-speed injection by superposing a driving force of the motor on energy accumulated in an energy accumulation device.

In order to achieve the above objects of the present invention, there is provided an injection mechanism in an injection molding apparatus, for performing injection by moving a screw forward through a power transmission device for converting rotational movement to linear movement. More particularly a rotating shaft of the motor is coupled to the power transmission device through a first clutch and to an energy accumulation device through a second clutch. During an operation excluding injection and metering, the second clutch is operated to couple the energy accumulation device with the motor to cause the energy accumulation device to accumulate energy, and during injection, the driving force of the motor is superposed on energy accumulated in the energy accumulation device to drive the screw so as to perform high-pressure, high-speed injection.

According to the present invention, energy generated by rotation of the motor during an idle time, i.e., excluding injection and metering times, is accumulated in the energy accumulation device. During injection, the accumulated energy in the energy accumulation device is added to the motor energy. Therefore, high-pressure, high-speed injection can be performed at a high response speed without the need of increasing the motor compact motor can be used, thus providing an economical advantage.

DETAILED DESCRIPTION OF THE PREFERRED EMBODIMENTS

The present invention will be described in detail with reference to the accompanying drawings.

Figure 1:
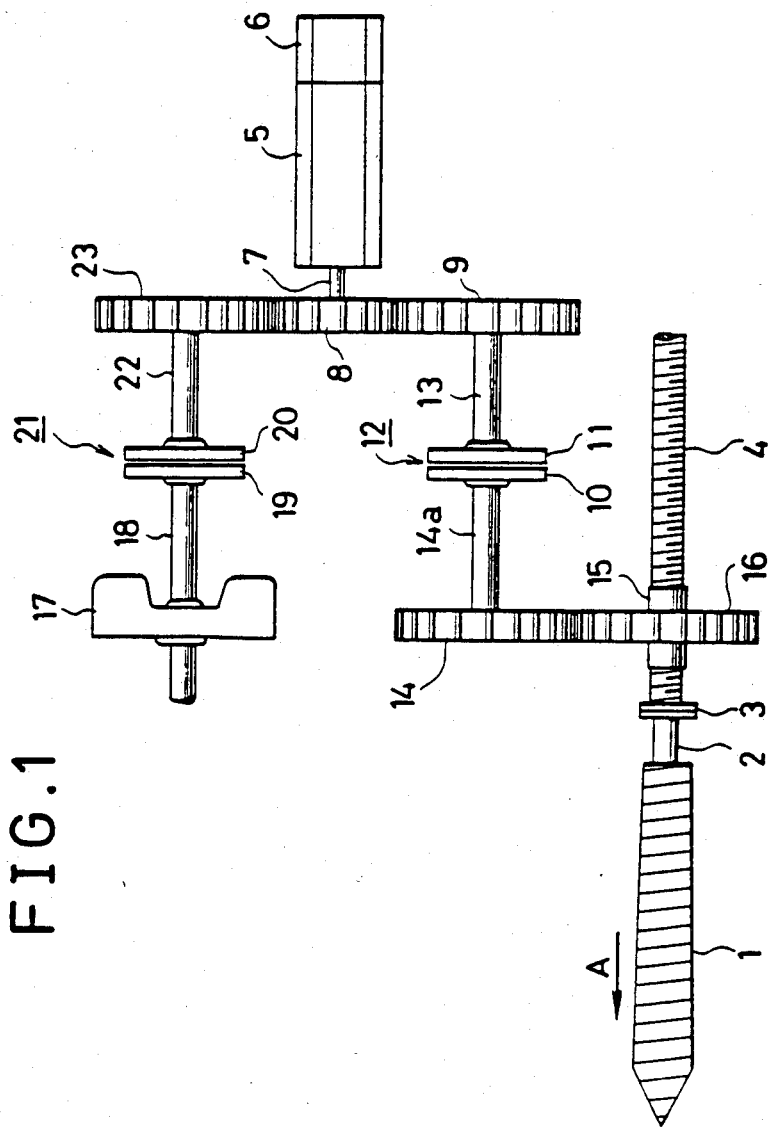
FIG. 1 is a schematic view showing an injection mechanism according to a first embodiment of the present invention.

FIG. 1 shows a first embodiment of the present invention. Reference numeral 1 denotes a screw mounted at a distal end of a screw shaft 2. A ball screw 4 as a male screw is coaxially mounted on the other end of the screw shaft 2 through a coupler 3 such as a flange. Reference numeral 5 denotes a servo motor. A sensor 6 is arranged on the servo motor 5 for position detection. A drive gear 8 is mounted at the distal end of a motor shaft 7. A transmission gear 9 is meshed with the drive gear 8. The transmission gear 9 is mounted on a transmission shaft 13 and is coupled to a transmission gear 14 mounted on a transmission shaft 14a through a clutch 12 having clutch plates 10 and 11. The transmission gear 9 is meshed with an operation gear 16 integral with a nut 15 meshed with the ball screw 4. Reference numeral 17 denotes an energy accumulation device. In this embodiment, the energy accumulation device 17 comprises a flywheel. The flywheel 17 is mounted on a wheel shaft 18 and is coupled to a transmission gear 23 mounted on a rotating shaft 22 through a clutch 21 having clutch plates 19 and 20. The transmission gear 23 is meshed with the drive gear 8.

In operation, when the clutch 12 is turned off, the clutch 21 is turned on, the servo motor 5 is operated in the non-injection/non-metering mode and the drive gear 8 mounted at the distal end of the motor shaft 7 is rotated, so that a rotational force is transmitted to the transmission gear 23 meshed with the drive gear 8. The flywheel 17 is rotated through the clutch 21 having the coupled clutch plates 19 and 20. When the speed of the flywheel 17 reaches a predetermined value, the clutch 21 is turned off and the servo motor 5 is stopped until an injection signal is generated. During injection, the clutches 12 and 21 are simultaneously engaged, i.e., the clutch plates 10 and 11 and the clutch plates 19 and 20 are coupled to each other, and at the same time the servo motor 5 is operated. The drive gear 8 is rotated at a high speed upon rotation of the servo motor 5 in coordination with the rotational force of the flywheel 17. The transmission gear 14 and the transmission gear 9 are also rotated at a high speed. The operation gear 16 meshed with the transmission gear 14 is rotated counterclockwise at a high speed. Therefore, the nut 15 integral with the operation gear 16 is rotated counterclockwise at a high speed. The ball screw 4 threadably engaged with the nut 15 is moved to the left in FIG. 1, and the screw 1 is also moved together with the ball screw 4 to the left in FIG. 1, thereby injecting a molten molding material at a high pressure and a high speed. Injection control is performed by the sensor 6 mounted on the servo motor 5.

During metering for determining the quantity of molding material being injected, the clutch 12 is turned on to couple the clutch plates 10 and 11 to each other. The clutch 21 is turned off. Every time a drag generated by the molten molding material upon rotation of the screw 1 reaches a predetermined pressure, the servo motor 5 is rotated in the reverse direction. The screw 1 is moved backward to a predetermined position while a back pressure is kept constant. When the screw 1 is detected at the predetermined position by the sensor 6, the clutch 12 is turned off and, at the same time, the clutch 21 is turned on. The servo motor 5 is rotated in the forward direction, and energy is accumulated in the flywheel 17. The same operation as described above is repeatedly performed.

In the above embodiment, the flywheel 17 and the clutch 21 are coupled to the transmission gear 23 meshed with the drive gear 8 driven by the servo motor 5. However, the transmission gear 23 need not be used. The clutch 21 may be coupled to the transmission gear 9 through the clutch 12 of the transmission shaft 13, so that the clutch 21 can be coupled to the flywheel 17. When energy is accumulated by the flywheel 17, the clutch 12 is turned off and the clutch 21 is operated. The rotational force of the servo motor 5 is transmitted to the flywheel 17 through the drive gear 8, the transmission gear 9 and the clutch 21, thereby accumulating energy. During injection, the clutches 12 and 21 are simultaneously operated.

Figure 2:
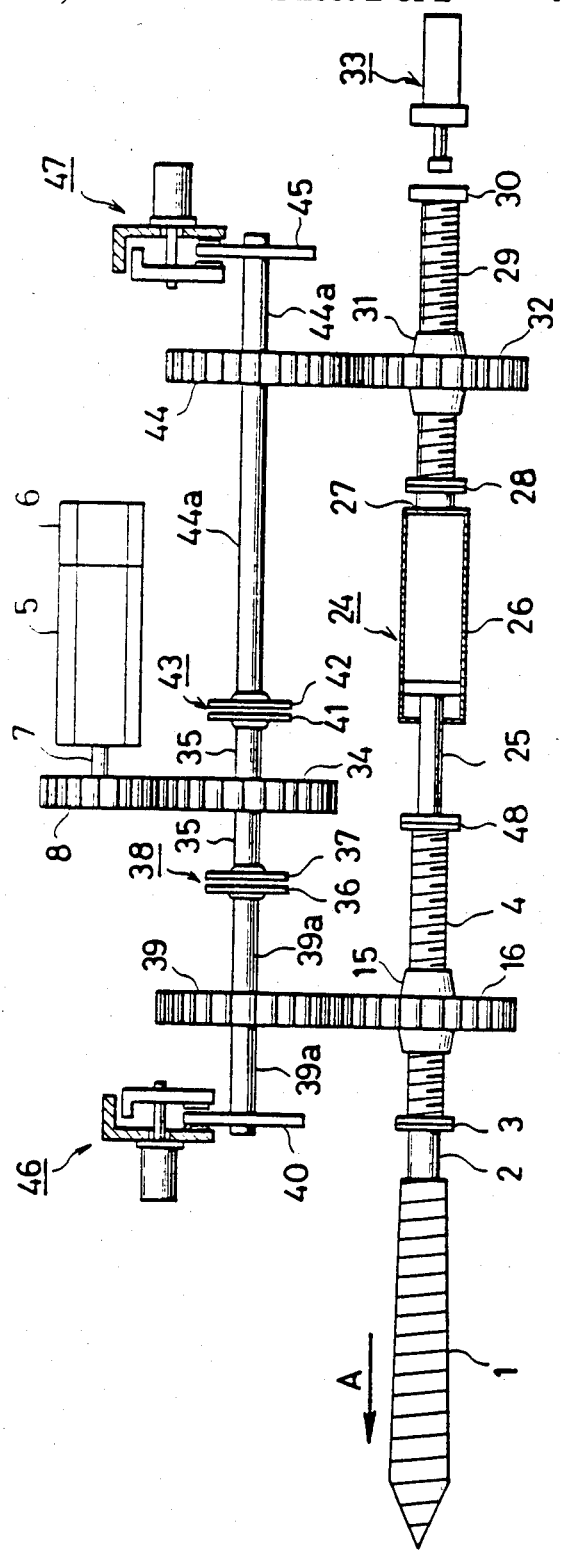
FIG. 2 is a schematic view showing an injection mechanism according to a second embodiment of the present invention.

FIG. 2 shows a second embodiment of the present invention. In this embodiment, the energy accumulation device comprises an accumulator, such as a gas accumulator 24.

A screw shaft 2 is mounted integrally with one end of a screw 1. A ball screw 4 is mounted coaxially with the rear end of the screw shaft 2 through a coupler 3 such as a flange. A piston rod 25 of the gas accumulator 24 is coupled to one end of the ball screw 4 through a coupler 48. A shaft 27 is coupled to one end of a cylinder 26 of the gas accumulator 24 filled with a high-pressure gas. A ball screw 29 is mounted to the distal end of the shaft 27 through a coupler 28. An abutment plate 30 is mounted on the distal end of the ball screw 29.

An operation gear 16 having a nut 15 meshed with the ball screw 4 is mounted thereon. An operation gear 32 having a nut 31 meshed with the ball screw 29 is mounted thereon. Reference numeral 33 denotes a shock absorber for damping the impact of the abutment plate 30.

A servo motor 5 integrally formed with a sensor 6 is coupled to a drive gear 8 mounted at the distal end of a motor shaft 7 in the same manner as in the first embodiment. Reference numeral 34 denotes a transmission gear meshed with the drive gear 8. The transmission gear 34 is mounted at the center of a transmission shaft 35. The transmission shaft 35 is coupled to a rotating shaft 39a of a transmission gear 39 meshed with the operation gear 16 through a clutch 38 having clutch plates 36 and 37 near one side of the transmission gear 34. A brake plate 40 is mounted integrally at the distal end of the transmission shaft 39a. A rotating shaft 44a of a transmission gear 44 meshed with the operation gear 32 is connected to one end of the shaft 35 through a clutch 43 having clutch plates 41 and 42. A brake plate 45 is integrally mounted on the other end of the rotating shaft 44a.

Reference numerals 46 and 47 denote brake units, respectively.

The operation of the second embodiment having the arrangement described above will be described hereinafter. The injection process is divided into four states: (i) a state for accumulating energy in the gas accumulator during a non-injection/non-metering mode; (ii) a state awaiting generation of the accumulated energy; (iii) an injection state; and (iv) a metering state. The operation modes of the clutches 38 and 43 and the brake units 46 and 47 in the four states are summarized in the next table.

|  | Clutch | | Brake | |
| --- | --- | --- | --- | --- |
|  | 38 | 43 | 46 | 47 |
| (i) Accumulation state | OFF | ON | ON | OFF |
| (ii) Waiting state | OFF | OFF | ON | ON |
| (iii) Injection state | ON | OFF | OFF | ON |
| (iv) Metering state | ON | OFF | OFF | OFF |

ON represents an operative state of the clutch or brake, and OFF represents an inoperative state of the clutch or brake.

The operation will be described hereinafter.

During the energy accumulation state, the clutch 38 is turned off and the brake unit 46 is turned on, so that the operation gear 16 is locked. Since the clutch 43 is turned on and the brake unit 47 is turned off, the transmission gear 44 is rotated through the drive gear 8 mounted on the motor shaft 7, the transmission gear 34 and the clutch 43 upon rotation of the servo motor 5. The operation gear 32 meshed with the transmission gear 44 is rotated counterclockwise. The nut 31 integral with the operation gear 32 is also rotated counterclockwise, so that the ball screw 29 is moved to the left in FIG. 2. The cylinder 26 of the gas accumulator 24 is moved to the left, and the high-pressure gas filled in the cylinder 26 is compressed to accumulate a compression force.

When the cylinder 26 is moved to a predetermined position, the clutches 38 and 43 are turned off, and the brake units 46 and 47 are turned on. The servo motor 5 is stopped. The gas accumulator is stopped until the compression force is released while energy is accumulated in the gas accumulator 24.

During injection, the servo motor 5 is driven, the brake unit 46 is turned on, and the clutch 38 is turned on. The rotational force of the servo motor 5 is transmitted to the nut 15. The clutch 43 is turned off and the brake unit 47 is turned on. The rotation of the gear 44 and the nut 31 and axial movement of the ball screw 29 are locked. For this reason, rotation of the servo motor 5 is transmitted to the gears 8 and 34, the clutch 38, the gear 39 and the nut 15, thereby moving the ball screw 4 to the left in FIG. 2. In this case, the gas accumulator 24 urges the ball screw 4 by accumulated compressed gas energy through the piston rod 25 to the left in FIG. 2. The screw 1 coupled to the ball screw 4 is moved at a high speed to the left in FIG. 2 while high-pressure, high-speed injection is being performed, thereby injecting the molten molding material.

During metering, the clutch 38 is turned on, and the clutch 43 and the brake units 46 and 47 are turned off. When the clutch 43 and the brake unit 47 are turned off, the gear 44 and the nut 31 are kept free. In this state, the compressed gas energy left in the gas accumulator 24 urges the ball screw 29 to the right in FIG. 2. The ball screw 29 causes the nut 31 and the gear 44 to rotate without a load and is moved backward to the right in FIG. 2. In this case, the impact of the abutment plate 30 is absorbed by the shock absorber 33. The screw 1 is rotated to inject the melted molding material. When the pressure generated by injection reaches a predetermined pressure, the servo motor 5 is rotated in the reverse direction through a predetermined angle. The nut is rotated in the reverse direction through the gears 8 and 34, the clutch 38 and the gear 39, and the screw 1 is moved backward by a predetermined distance to the right in FIG. 2. When the sensor of the servo motor 5 detects that the screw has reached the predetermined position, the motor 5 is stopped and the energy accumulation described above is repeated.

I claim:

1. An injection mechanism in an injection molding apparatus, comprising:
   (a) a power transmission device for converting rotation of a motor to linear movement;
   (b) a first screw for performing injection connected to the power transmission device;
   (c) means for accumulating energy; and a first clutch;
   (d) a motor having a rotating shaft which is coupled to said power transmission device through a first clutch and is coupled to said energy accumulation means through a second clutch, wherein, during non-injection/non-metering, said second clutch is operated to cause said energy accumulation means to accumulate energy, and wherein during injection, said first screw is moved by rotation of said motor and the energy accumulated by said energy accumulating means.

2. A mechanism according to claim 1, wherein said energy accumulation means comprises a flywheel.

3. A mechanism according to claim 1, wherein said energy accumulation means comprises an accumulator.

4. A mechanism according to claim 3, wherein said accumulator comprises:
   (a) a second screw, a first end of which is fixed at one end of the first screw;
   (b) a piston rod fixed at a second end of said second screw;
   (c) a cylinder, a first end of which receives the piston rod;
   (d) a third screw connected to a second end of the cylinder and axially moved and meshed with a nut driven through said second clutch; and
   (e) brake means for selectively locking movement of said second and third screws.

5. A mechanism according to claim 1, wherein said motor comprises a servo motor.

* * * * *

UNITED STATES PATENT AND TRADEMARK OFFICE
CERTIFICATE OF CORRECTION

PATENT NO. : 4,601,653

DATED : 7/22/86

INVENTOR(S) : INABA

It is certified that error appears in the above-identified patent and that said Letters Patent is hereby corrected as shown below:

Col. 1

Line 61, after "motor" insert --power.--;
Line 62, before "compact" insert --As a result, a--.

Signed and Sealed this

Twenty-fifth Day of November, 1986

Attest:

DONALD J. QUIGG

Attesting Officer

Commissioner of Patents and Trademarks